Nov. 21, 1939.   O. C. TERRELL   2,180,917
RUNNING GEAR FOR MOTOR VEHICLES
Filed Sept. 22, 1938   2 Sheets-Sheet 1
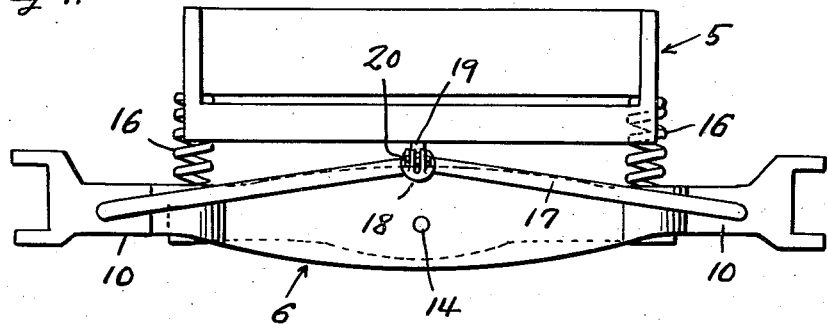
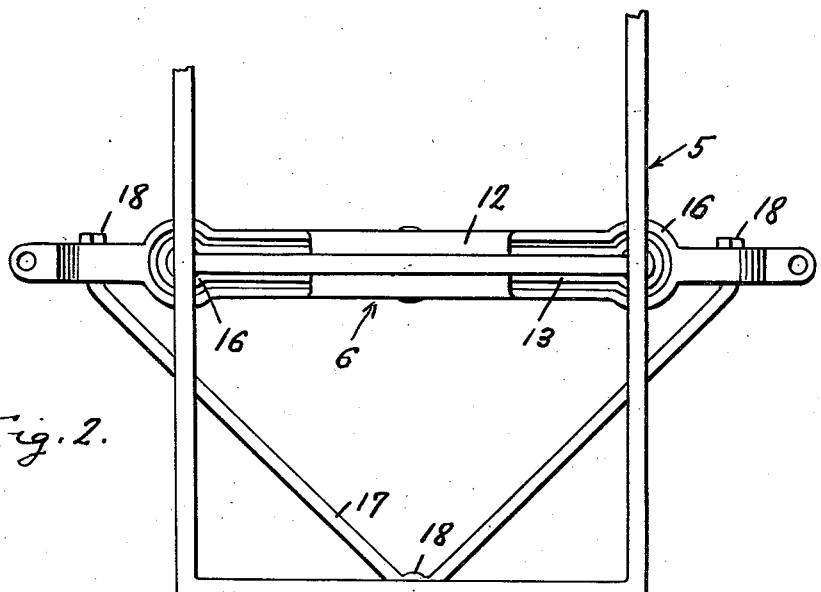
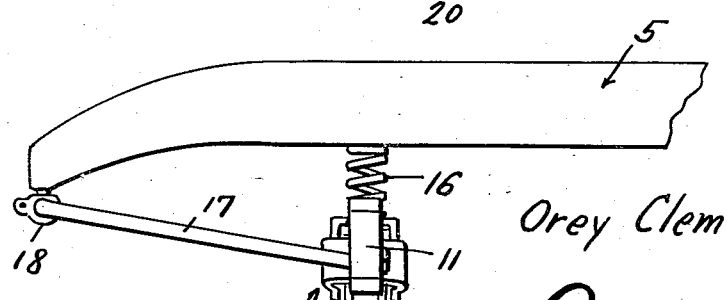
Inventor
Orey Clemment Terrell
By Clarence A. O'Brien
and Hyman Berman
Attorneys Nov. 21, 1939.   O. C. TERRELL   2,180,917
RUNNING GEAR FOR MOTOR VEHICLES
Filed Sept. 22, 1938   2 Sheets-Sheet 2

Inventor
Orey Clemment Terrell

By Clarence A O'Brien
and Hyman Berman
Attorneys

Patented Nov. 21, 1939

2,180,917

UNITED STATES PATENT OFFICE 2,180,917

RUNNING GEAR FOR MOTOR VEHICLES

Orey C. Terrell, Attica, Kans.

Application September 22, 1938, Serial No. 231,272

1 Claim. (Cl. 280—112)

This invention relates to running gears for motor vehicles, the object being to provide a running gear which is so constructed that the frame will be prevented from being twisted when traveling over rough roads, the frame being properly held in its proper position during the various movements of the body of the vehicle.

The invention together with its objects and advantages will be best understood from a study of the following description taken in connection with the accompanying drawings, wherein:

Figure 1 is an elevational view illustrating one form of the invention.

Figure 2 is a top plan view illustrating the invention.

Figure 3 is a side elevational view illustrating the invention.

Figure 4:
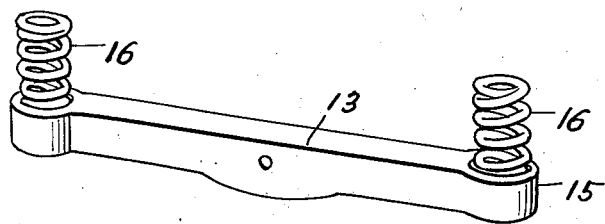
Figure 4 is a perspective view of a beam forming part of the invention.
Figure 5:
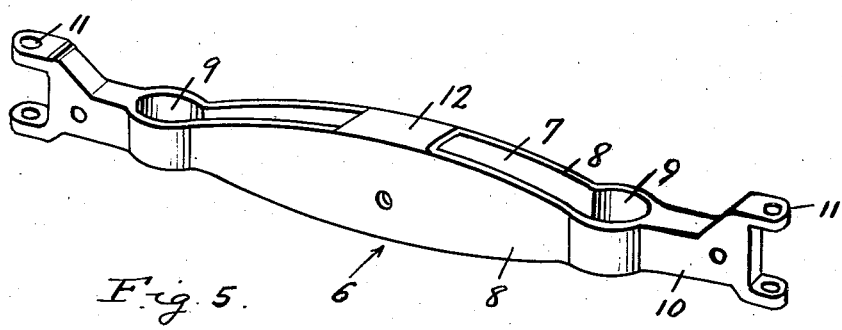
Figure 5 is a perspective view of an axle forming part of the invention.

Referring more in detail to the drawings, it will be seen that I have shown fragmentarily a portion of the chassis frame of a motor vehicle, said portion of the frame being indicated generally by the reference numeral 5.

In accordance with the present invention there is provided an axle 6 having an elongated slot 7 therethrough. The sides 8 of the axle forming the slot 7 taper from the transverse center thereof toward the opposite ends of said sides, and at said ends said sides merge with the walls of substantially circular through openings 9. Beyond the openings 9 the axle terminals 10 are solid. The terminals 10 of the axle are suitably provided as at 11 to form knuckle joints through the medium of which the stub axles for the wheels of the vehicle are pivoted to the axle.

Intermediate the ends thereof the sides 8 of the axle at their upper edges are connected by a bridge member 12.

A beam 13 is accommodated within the slot 7 and intermediate its ends is pivoted within the slot as at 14.

At the ends thereof the beam 13 is substantially circular as at 15 providing sockets receiving the lower ends of coil springs 16.

At the upper ends thereof the springs 16 are welded or otherwise secured to the side members of the chassis frame 5.

Further in accordance with the present invention there is provided a radius rod 17 which has the ends thereof bolted or otherwise secured as at 18 to the terminals 10 of the axle. Intermediate its ends the radius rod 17 is provided with a split socket 18 that accommodates a ball 19 suitably provided on an end member of the chassis frame 5. Socket 18 is equipped with bolt and nut means 20 through the medium of which the socket may be contracted to the desired extent about the ball 19.

It will thus be seen that the frame 5 is supported from the axle 6 through the medium of the beam 13 and springs 16 and that the axle 6 is free to rock on the pivot 14. Thus it will be seen that the frame of the vehicle is enabled to maintain itself in a horizontal plane regardless of whether the vehicle is moving over smooth or rough surface on the roadway or in field work.

It is thought that a clear understanding of the construction utility and advantages of an invention embodying the features of the present invention will be had without a more detailed description; it being apparent that my invention is a rocker type axle having several advantages over the conventional types.

The conventional type and knee-action models on the market today have a lot of wearing parts while this one does not. The only wearing part is the pivot in the center of cross bar which supports the frame. The car using this axle will have no springs nor shackles to grease and to replace when worn out. The only point which requires grease would be a bearing on the pivot. This axle operates on radius rods which would also be subject to very little wear.

Another advantage would be the riding qualities which this front mounting would offer. If a front wheel were to strike an object four inches high, the main frame of the car would only be raised half the distance due to the center lift. Furthermore, passengers would not be thrown from one side of the car to the other. The only motion of the car would be up and down rather than swerving.

The frame of the car would always be in a level position and never in a twist. The rear wheels as well as the front would have no effect on the position of frame. This would likewise keep the motor level and motor mountings would last longer because of less vibration.

Having thus described the invention what is claimed as new is:

In a vehicle including a frame, an axle having a longitudinally extending slot therein, the ends of which terminate in substantially circular openings which are spaced inwardly from the ends of the axle, said slot and openings passing through the upper and lower edges of the axle, a bridge piece connected with the top of the axle at the center thereof and bridging the central portion of the slot, a beam wholly located in the slot and having enlarged substantially circular ends which are located in the openings at the ends of the slot, a pivot member passing through the transverse centers of the axle and beam, the circular ends of the beam having spring seats in their upper ends and coiled springs resting on said seats and engaging under portions of the frame.

OREY C. TERRELL.